July 16, 1968

F. A. AXELSSON 3,393,052

FOAM MIXING HEAD APPARATUS

Filed March 9, 1965

INVENTOR.
FOLKE A. AXELSSON
BY
ATTORNEYS

July 16, 1968  F. A. AXELSSON  3,393,052
FOAM MIXING HEAD APPARATUS
Filed March 9, 1965  2 Sheets-Sheet 2

INVENTOR.
FOLKE A. AXELSSON
BY
ATTORNEYS

United States Patent Office 3,393,052
Patented July 16, 1968

3,393,052
FOAM MIXING HEAD APPARATUS
Folke A. Axelsson, Grand Haven, Mich., assignor to Airspace, Inc., Fruitport, Mich., a corporation of Michigan
Filed Mar. 9, 1965, Ser. No. 438,338
4 Claims. (Cl. 23—252)

This invention relates to equipment for mixing reactant plastic materials, and more particularly relates to a unique shearing, resin-mixing element in a mixing head for thorough blending of reagents.

The formation of structural laminates or of other articles with a foam plastic core, e.g. of polyurethane, or of other articles of injected foaming plastics usually necessitates a mixing head to combine the ingredients in the required reactive proportions just prior to injection. These mixed ingredients are then injected through an outlet in the head into the mold or form. Mixing heads presently available present some considerable problems in their use. This is due to the fact that the reacting reagents are difficult to mix and handle. Specifically, it is very difficult to achieve thorough mixing of the catalyst, activator, and resin base. This causes some portions of the mixture to be over-reacted and/or over-foamed, while others are under-reacted and/or under-foamed.

Known mixing units include a housing forming a mixing chamber into which the ingredients are injected, and a revolving mixer assembly in the chamber to force ingredients through blades to blend them. Efforts to increase the degree of mixing for a more thorough and uniform blend of the viscous chemical reagents have heretofore resulted in the use of various styles, shapes, and complex assemblies of mixers. These include multipart impeller assemblies that push the ingredients back and forth between the impeller blades. They also include ribbed units that force the ingredients through small passageways. However, although these units create a useable mixture, the mixing action is not thorough and uniform. The viscous, expanding, exothermically reacting ingredients, reacting at constantly increasing rates of reaction, are extremely difficult to handle. This is especially true because of the short time period during which the mixing exothermically reacting reagents can remain in the mixing unit before they must be ejected because of the large expansion caused by the vaporizing blowing agent liquid as it changes into a gas.

It is therefore an object of this invention to provide a chemical reagent mixing head that has excellent mixing capacity, to obtain thorough mixing in a short period of time.

It is another object of this invention to provide a mixing unit especially suited for viscous chemical reagents to be blended together in thorough fashion for a uniform mixture.

It is another object of this invention to provide a unique mixing unit or mixing head especially suited for chemically reacting foamable reagents, capable of achieving thorough mixing for a uniform resulting product, on a continuous basis in a short time interval.

It is still another object of this invention to provide a mixing unit capable of continuously, thoroughly mixing chemically reacting, exothermic high pressure ingredients while injecting an expanding foaming agent, and to do so rapidly.

These and several other objects and purposes of this invention will become apparent upon studying the following specification in conjunction with the drawings in which.

Figure 1:
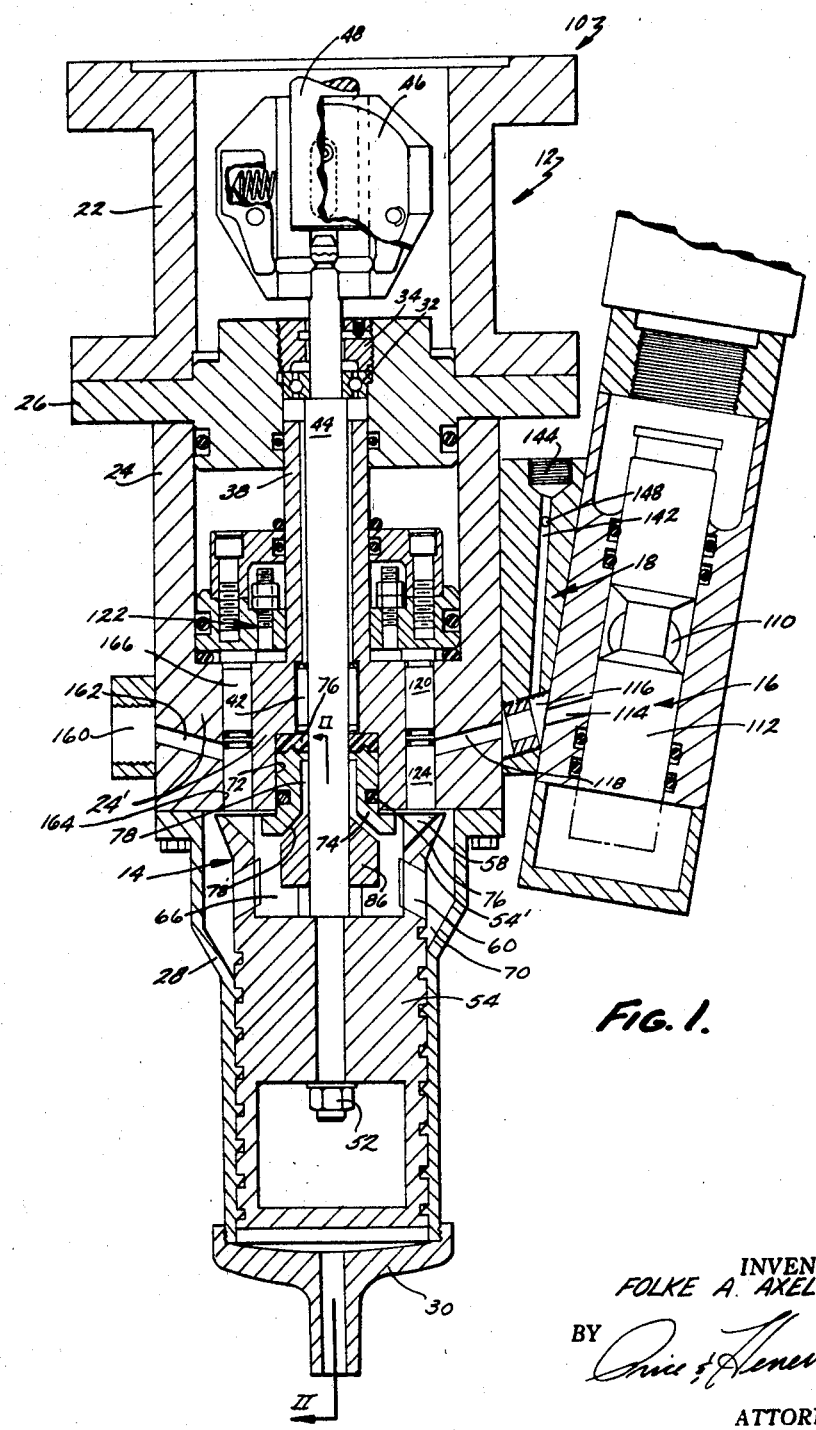
FIG. 1 is a side elevational, sectional view of the novel mixing vessel or head.

Referring now specifically to the drawings, the complete assembly 10 (FIG. 1) basically includes a housing subassembly 12, a mixing mechanism subassembly 14, a resin injector subassembly 16, and a coupling adapter plate fitting 18.

The enclosing housing 12 may be of any suitable construction, preferably of the interconnected elements shown. It includes shell elements 22 and 24 securing an annular bearing support 26 therebetween, and a mixing chamber shell 28 to which an outlet nozzle 30 is attached. Support 26 secures a shaft bearing 32 and its retainer 34. The central opening in the support also receives the upper end of an annular, elongated sleeve 38 projecting upwardly from the base 24' of shell portion 24. This base also includes a central opening receiving a needle bearing assembly 42. Rotational shaft 44 is retained by bearings 32 and 42. The upper end of shaft 44 is attached to a gripping drive clutch assembly 46 secured to a drive shaft 48.

Figure 4:
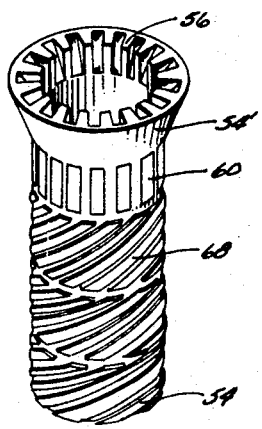
FIG. 4 is a perspective view of the mixing element for the head.
Figure 5:
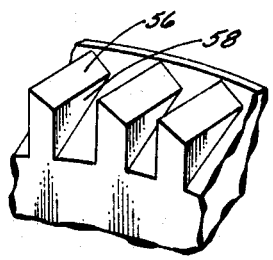
FIG. 5 is an enlarged, fragmentary, perspective view of a portion of the top of the mixer element.

Attached to the lower end of shaft 44 by a nut and thread securement 52 is a generally cylindrical, elongated mixing element 54. This mixing element includes an upwardly flared end 54' formed of a plurality of adjacent shearing teeth 56 (FIG. 5) and intermediate recesses 58. It also includes a plurality of lower outlet openings 60 (FIG. 4) extending between the upper central cavity 66 in the mixing element, and its outer periphery. A plurality of helical, material-advancing ribs or threads 68 are formed as part of the cylindrical peripheral surface of the mixing element to move the mixed ingredients down through shell 28 to nozzle 30.

The mixing element fills a major part of mixing chamber 70 defined by shell portion 28. In the base 24' adjacent the mixing chamber, and co-axial with shaft 44, is a recess or cavity 72. It is cylindrical in configuration and receives a special annular collar element 74. The collar fits around shaft 44. It has a sealing ring 76 fitted against the housing.

Figure 2:
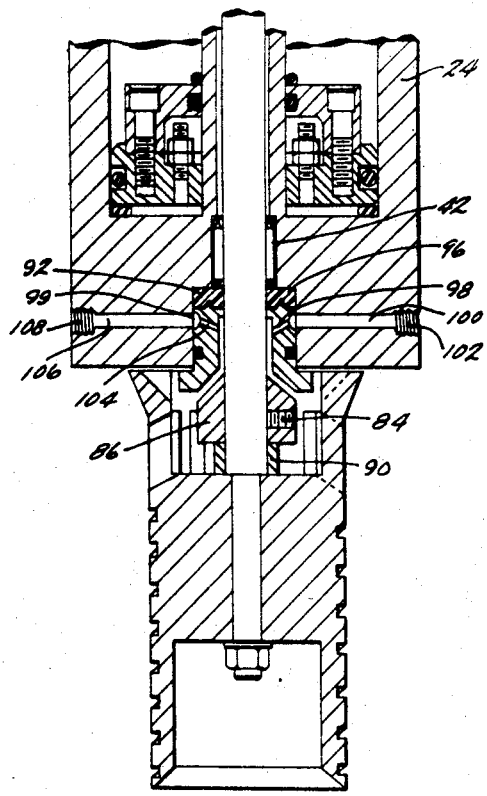
FIG. 2 is a fragmentary, sectional, elevational view of a portion of the mixing unit in FIG. 1, taken on the vertical plane II—II normal to the vertical section plane in FIG. 1.

The inner diameter of collar 74 is machined to a slightly larger dimension than the adjacent shaft diameter to form a narrow, restricted, annular passage means 78 around the shaft along a portion thereof. The lower end 78' of the passage means diverges in frusto-conical configuration into the mixing chamber, and more specifically, into the cavity portion 66 on the upper end of the mixer element. Attached to shaft 44 by a set screw 84 (FIG. 2) adjacent collar 74 is a second collar 86. It has a tapered frusto-conical upper surface corresponding to the frusto-conical lower outlet portion of the annular passage in collar 74 to fit closely thereto. Consequently, adjustment of collar 86 toward and away from collar 74 regulates the size of the flared outlet portion 78' of the annular passage means 78 to regulate flow of material therethrough. The mixing element 54 is held with respect to collar 86 by an annular spacer 90.

Collar 74 is sealed at its upper end by an annular seal 92 adjacent needle bearings 42. The collar includes a pair of passages, with the first passage 96 extending from inner annular passage means 78 to a peripheral inlet port 98. This communicates with a third passage 100 which extends through the wall of base 24' of housing portion 24. A suitable threaded connection 102 is provided for the blowing agent, such as refrigeration, compressed Freon.

A second passage 104 similar to passage 96 extends through collar 74 to a second inlet port 99, which communicates with a third passage 106. This passage extends through the housing base from a threaded connection 108, where a supply line for a releasing solvent is attached. This releasing solvent releases the mixed reagents from the wall surfaces for discharge. A typical solvent for polyurethanes is methylene chloride, for example.

Injection of the blowing agent through these cited passages causes it to flow down a portion of the shaft through the annular passage means and into the mixing chamber in controlled volumes. Likewise, injection of the releasing solvent at the end of the mixing time for the batch causes it to flow down the shaft to clean out the components and release the foamable reagents. These are used in a manner specifically described hereinafter.

The resin inlet structure 16 is of generally conventional construction. It includes an inlet passage 110 for the resin base material. A reciprocable plunger 112 having a central annular recess portion adjacent inlet port 110 enables the regulation of the resin inlet to the mixing chamber. When it is shifted to the position illustrated in FIG. 1, no resin is injected. When it is shifted to a lower position as illustrated by the phantom lines in FIG. 1, resin is injected. Port 110 can communicate through this annular portion to passage 114 and passage 116, thence to passage 118 in the housing.

Figure 3:
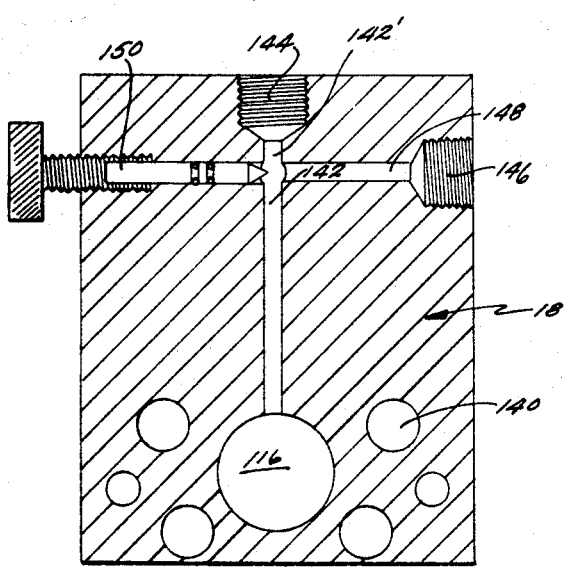
FIG. 3 is a sectional, elevational, enlarged view of the adapter coupling fitting between the resin injection plunger unit and the main housing of the head.

Under normal conditions during injection of the resin, plunger 120 is in a raised position with elevation of the reciprocable piston assembly 122, to allow flow from passage 118 down through passage 124 into the mixing chamber through the shearing mechanism formed by teeth 56 and cavities 58. Positioned between housing portion 24 and this cylinder assembly 16 is an adapter fitting 18. As seen more specifically in FIG. 3, this adapter coupling assembly includes bolt receiving openings 140 for attachment, and passage 142 leading to passage 116. This passage 142 in turn has two inlets, one from the threaded connection 144 through passage 142' for solvent entry, and one from the threaded connection 146 through passage 148 for injection of the catalyst for the reaction. A needle valve assembly in the adapter 150 controls flow through passage 148. The catalyst and/or the solvent, therefore, flow through passage 142 to passage 116, to passage 118, to passage 124, and into the mixing chamber. It will be noted, therefore, that the catalyst enters through the resin passage a considerable distance removed from the mixing chamber. The unplugging plunger element 120 is between the mixing chamber and the catalyst passage and its outlet port into the resin passage. This has an important result as will be described hereinafter.

On the opposite side of the housing is a second inlet connection 160 for the reaction actuator chemical reagent. This associates or communicates with passage 162, and through passage 164 having a similar reciprocable plunger 166 therein, into the mixing chamber.

Operation

In studying the described operation of the novel apparatus, it will be understood that this novel unit was developed for and is intended mainly for foamable plastic materials to form injectable substances such as reacting polyurethane foam that will blow after injection. Therefore, for purposes of convenience, it will be described with respect to these particular materials and type of substance. However, it is conceivable that it could be employed with other similar materials or applications that present similar problems of mixing and handling.

To prepare a material such as a polyurethane resin to be injected into a mold, a form, or between two panels of a sandwich laminate, for example, the resin must be expanded by a blowing agent. This agent can be formed as part of the chemical reaction, e.g. the formation of carbon dioxide by the addition of water to the reacting polyisocyanate materials, or by injecting a separate blowing agent into the mixture. This external blowing agent, often a Freon gas producing material, is added to the mixing ingredients as a compressed refrigerated liquid. The basic ingredients, therefore, include (1) the resin base material, for example an isocyanate such as polymethylene, polyphenyl isocyanate or 2,4-tolylene diisocyanate or other like useable materials; (2) an activator reagent such as epichlorohydrin or a polyol such as a polyester or polyether type containing hydroxyl groups, including typical substances such as adipic acid or polypropylene glycol; (3) a blowing agent such as the Freon types mentioned above; and (4) a catalyst such as a tertiary amine or its equivalent, all of which are well known and regularly used.

In order to obtain a reaction, the isocyanate, the hydroxyl activator, and the catalyst must be mixed. To obtain foam expansion of the mixed reagents, the refrigerated blowing agent must be mixed right in with the others, by introducing it in its liquid form so that it will be heated by the exothermic chemical reaction. During reaction of the reagents, the exothermic nature of the reaction also causes pressure to occur as well as heat.

In operation, the isocyanate or resin base is injected from port 110 through passages 114, 116, 118, 124 into the rapidly rotating shearing cavities 58 and into the mixing chamber, on a continuous basis. The catalyst is simultaneously injected through passage 148, down passage 142 to passage 116, to enter with the resin base. It is not injected directly into the mixing chamber, and is not in direct communication therewith. Also, at this same time, the actuator material such as the hydroxyl containing reagent is injected through passageway 162 annd passageway 164 into the shearing cavities 58. Since shaft 44 and mixing element 54 are rotated at high speeds, the shearing teeth alternately slice off very thin layers of tiny amounts of resin and then mix them continuously and thoroughly as they pass through the passageways.

More specifically, as the mixer element revolves at a high rate of speed, the adjacent sharp edegs of the teeth 56 shear off tiny portions first of the one viscous reagent and then of the other reagent to force them together in intimate overlying fashion. Since the pressure is built up upon these viscous materials as this shearing action takes place, and since only a tiny thin sheet of each reagent is sheared off at a time, the reagents have optimum contact with each other as they are ejected out of their passageways in between the shearing teeth. The operation occurs continuously, with the mixing reagents being forced off the diagonal bottom surface of these cavities 58 between the teeth into the mixing chamber cavity itself. By the time the ingredients reach the mixing chamber, in fact by the time they leave the teeth, they are already thoroughly blended.

At this position the blowing agent is injected into the flowing mixture, in a peripheral pattern which extends diagonally outwardly to converge with the mixed resin as it flows off the base of cavities 58 under pressure. This causes optimum association of the blowing liquid-gas with the materials steadily flowing off the shearing cavities.

The structure is, therefore, not dependent upon mixing in the chamber itself as was previously done, since the mixing occurs immediately upon entry into the chamber. It then moves steadily down out of the chamber through the helical advancing teeth or the equivalent, and out the lower nozzle. It remains in the unit only a brief interval of time after mixing thereby allowing injection into the mold (not shown) from the nozzle considerably prior to substantial expansion with the increasing heat of the exothermic reaction. Consequently, the time lag is very small, with the output rate being substantial. This increases the efficiency, and also allows the operator of the machine to eject the plastic into the mold assembly without undue concern over premature expansion. In fact, it may be desirable and possible in some instances to do away with the helical passage advancing feed (FIG. 4) and cause the materials to pass directly out of the nozzle.

With prior equipment the time period that the ingredients remained in the mixer was extended as much as possible in the hopes of getting better mixing. Ejection was made as close as possible prior to expansion of the blowing agent as it absorbed heat from the exothermic chemical reaction.

It will be noted that passageways 124 and 164 are aligned directly with the shearing chambers and teeth of the impeller mixer, thereby requiring the materials to pass through this special shearing apparatus. The mixed resin is then fed down by helical screws 68 out nozzle 30.

When the injection is complete to fill the particular mold (not shown), the supply of ingredients is stopped, and piston 122 is shifted, as by air pressure, to lower plungers 120 and 166. This forces any residual resin and actuator out passageways 124 and 164, and to close off this passage, preventing flow of the materials from the mixing chamber back through the passageways under the tremendous pressures created. This, of course, protects the tiny passages for the blowing agent and the solvent.

Continuously during the injection of the resin and the actuator, and during the mixing and discharge of the mixed foaming resin out nozzle 30, the blowing agent is injected under pressure through passage 100 (FIG. 2), passage 96 and annular passage means 78, down the shaft surface and into the chamber. The amount of blowing agent admitted constantly through this chamber is regulated so that the total amount is exactly that required by the batch of resin mixed. By injecting the blowing agent down around the shaft in this fashion, it provides a constant high velocity washing or wiping action around the entire periphery of the shaft toward the mixing chamber, thereby preventing the reagents from flowing backwardly through the narrow annular passage means against the force of the high pressure blowing agent, and up into the bearings. It has been found that this is an extremely effective method of achieving clean bearings without penetration of the high pressure foaming materials to jam the mechanism. In fact, under actual operation conditions, at least two to three thousand mixing and injection shots can be achieved without requiring cleaning of the mechanism.

This flowing cleaning action is supplemented by the intermittent injection under pressure of the releasing and cleaning solvent through passage 106 and down the annular passage means at the end of each mixing operation. This solvent, which causes the foaming material to release from the surfaces, readily removes any small bit of foam which may have started up along the shaft, as well as loosening all other foam in the mixing chamber to be discharged under an air pressure blast subsequently injected. As stated previously, some of the solvent is also injected through the adapter plate to clean out the resin passage. The total amount of the two is of course carefully regulated.

Although the catalyst injection passage and port is shown to communicate with the resin injection passage, it could conceivably be associated either partially or totally with the actuator passages, provided it does not come into direct communication with the mixing chamber as taught above. Therefore, this variation is within the concept of this inventive construction.

The novel assembly has proven to be a substantial advance in mixing heads, being extremely reliable, trouble-free, thorough, and rapid in operation. Other advantages will also occur to those in the art.

Conceivably certain detailed portions of the apparatus could be modified to suit a particular situation, type of resin, or injection sequence, without departing from the concepts set forth herein. Therefore, this invention is to be limited only by the scope of the appended claims, and the reasonable equivalents thereto.

I claim:

1. A chemical reagent mixing unit comprising: a housing forming a chamber therein having an outlet; rotatable mixing means in said chamber; said mixing means including a plurality of spaced peripheral shearing teeth and intermediate spaces at one axial end thereof, said spaces being enclosed on the peripheral outer portion thereof; said spaces having outlet means on the inner peripheral portion thereof for mixed reagents, said mixing means having a receiving area for the mixing reagents adjacent said spaces, and outlet means therefrom; said housing having a wall surface closely adjacent said teeth and spaces; a plurality of separate reagent passage means in said housing for entry of separate reagents to be mixed; said passages having spaced successive outlet ports in said wall surface immediately adjacent and aligned with said teeth and spaces, so that said teeth successively and repeatedly shear off tiny slices of different reagents entering through said successive ports and intimately mix them together by laying the tiny slices one upon the other, while advancing the superposed slices along said spaces between said teeth.

2. A reagent mixing unit comprising: a housing forming an enclosed chamber therein subject to pressure and having an outlet for mixed reagents; a rotatably driven symmetrical mixer in said chamber and having an upper end face; rotatable drive means associated with said mixer to rotate it about the center of said face; a plurality of adjacent, spaced, radially and axially oriented sharp-edged shearing teeth on said end face; said teeth forming axially oriented receiving spaces therebetween which are enclosed on the outer periphery thereof, and each having material flow outlet means on the inner periphery thereof; said housing having a surface immediately adjacent said shearing teeth; and a plurality of reagent passages in said housing having outlet ports in said surface, aligned with said teeth and spaces, to cause entry of reagents into said chamber at said teeth and spaces to cause repetitive successive shearing by said teeth of small quantities of a plurality of reagents, superimposing of said quantities of reagents in said spaces, and advancement of said quantities through and out of said spaces and said chamber, as said mixer is rotated.

3. A mixing head for foamable reagents to form a foamed, expanded resin, comprising: a housing having a mixing chamber with an outlet therefrom; a rotational drive shaft extending into said chamber through said housing; an elongated mixer in said chamber, operably connected to said rotational drive shaft; a plurality of reagent inlet passages to said chamber for resin, activator, catalyst, and blowing agent in said housing to said chamber; said mixer having a peripheral rim forming a central cavity; said rim having a plurality of radially oriented and axially extending slots and intermediate sharp-edged teeth; said slots having bottom surfaces slanted toward said central cavity; said teeth having axial end shearing surfaces adjacent a correspondingly configurated housing surface, forming a slight clearance therebetween; at least said resin and actuator passages having outlet ports immediately adjacent said shearing teeth and slots, and aligned therewith to cause repeated alternate shearing of tiny portions of the resin and actuator ingredients by said teeth and intimate mixing; and said blowing agent passage having a circular outlet directed axially down around said shaft and divergently outward therefrom generally toward said slanted bottoms of said slots to blend the blowing agent with the mixed actuator and resin reagents.

4. A mixing head for foamable reagents to form a foamed plastic, comprising: a housing having a mixing chamber with an outlet therefrom; an elongated, generally cylindrical mixer in said chamber, operably connected to a rotational drive shaft; reagent inlet passages to said chamber for resin, activator, catalyst and blowing agent in said housing to said chamber; said mixer having a peripheral rim forming a central cavity; said rim having a plurality of radially oriented slots and intermediate sharp-edged shear teeth; said teeth having end shearing surfaces adjacent a correspondingly configurated housing surface, forming a slight clearance therebetween when said mixer is rotated; at least said resin and actuator passages having outlet ports immediately adjacent said shearing teeth, and aligned therewith; and said blowing agent passage having an annular restricted outlet around said shaft axially thereof to flow the blowing agent into said central cavity into the mixed actuator and resin reagents.

References Cited

UNITED STATES PATENTS 2,961,223   11/1960   Dooley _____ 259—9

JAMES H. TAYMAN, JR., *Primary Examiner.*